United States Patent Office 3,195,630
Patented July 20, 1965

3,195,630
SEALING FORMATIONS
Henry B. Fisher, Bartlesville, Okla., assignor to Phillips Petroleum Company, a corporation of Delaware
No Drawing. Filed May 22, 1961, Ser. No. 127,413
10 Claims. (Cl. 166—30)

This invention relates to sealing formations. In one of its aspects the invention relates to a method of sealing or plugging a permeable formation by injecting a water solution of urea into the formation. In another of its aspects the invention involves injecting into a formation into which urea is also injected a solution of a compound which will react with carbon dioxide and/or ammonia which is liberated from the urea in the formation, to form an insoluble precipitate or sealing agent. In a further aspect of the invention urea and a material such as barium chloride or ferric chloride are injected into a formation to plug the same. In a further aspect of the invention an additional agent controlling or aiding the decomposition of the urea to liberate carbon dioxide and ammonia is also placed into the formation to be sealed. A further aspect, still, of the invention is the injection into the formation of a hydrolyzable material such as ferric chloride or aluminum chloride which will be precipitated by the alkalinity due to the ammonia liberated by the decomposition of the urea in the formation. A still further aspect of the invention is that it provides a sealing fluid having urea as one of its components and as another of its components a material which will react with carbon dioxide liberated from the urea to form an insoluble material.

the sealing or plugging of formations. A further object of this invention is to provide a sealing fluid for the sealing of permeable formations. A still further object of this invention is to provide a method for sealing formations wherein the rate at which a sealing agent is formed in a formation to be sealed can be controlled.

Other aspects, objects and the several advantages of this invention are apparent from a study of this disclosure and the appended claims.

According to the invention there is provided a method of sealing a porous or permeable formation which comprises injecting into said formation urea and a material which will combine with carbon dioxide and/or ammonia liberated from said urea in said formation to form an insoluble material.

EXAMPLE

A qualitative test was made in which about 2 grams of $FeCl_3 \cdot 6H_2O$ was added to 100 ml. of $H_2O$. The $FeCl_3 \cdot 6H_2O$ was dissolved and about 2 grams of urea was added and dissolved. The resulting solution was clear. This solution was warmed to about 140° F. ($\pm 5$) and held at this temperature. About 3 minutes was required to warm up the solution. The solution remained clear for 20 minutes and then developed turbidity and finally a heavy floc appeared. More quantitative tests were performed and the following results were obtained which show that control can be had over the time required to develop turbidity and formation of a precipitate. Solutions were heated on a Thermo-Stir hot plate (magnetic stirrer) in open beakers.

| Test No. | Composition solution | | | Minutes heating to 130° F. | Minutes at— | | |
|---|---|---|---|---|---|---|---|
| | Ml. $H_2O$ | Gms. $FeCl_3 \cdot 6H_2O$ | Gms. Urea | | 130–135° F. to develop faint turbidity | 130–135° F. to develop slight floc | 130–135° F. to develop heavy floc |
| 1 | 100 | 2 | 2 | 7 | 20 | 30 | [1] 500 |
| 2 | 100 | 4 | 2 | 7 | 31 | 40 | 90 |
| 3 | 100 | 6 | 2 | 7 | 52 | 75 | 100 |

[1] Heated to 190° F. and heavy floc appeared.

The decomposition of urea in water at elevated temperatures can be represented by the reaction $$CO(NH_2)_2 \xrightarrow{H_2O} CO_2 + 2NH_3$$

Thus, if barium chloride and urea are present in the injection fluid in a well, according to the invention, then barium carbonate will be precipitated as the carbon dioxide begins to be evolved or formed. If a hydrolyzable salt such as $FeCl_3$ is present, it will be hydrolyzed and precipitate will be formed.

Thus, it will be obvious to those skilled in the art in possession of this disclosure that the increase in alkalinity due to the decomposition reaction of the urea can be used to precipitate various acid solutions. Thus, calcium oxalate can be precipitated from an initially acid solution. Similarly aluminum hydroxide and ferric hydroxide can be precipitated from solutions of aluminum chloride and ferric chloride (or sulfates). The gelatinous character of aluminum and ferric hydroxides renders these materials quite interesting as plugging materials.

An object of this invention is to provide a method for

When 2 grams of ammonium carbonate was added to a solution containing 2 grams of $FeCl_3 \cdot 6H_2O$ in 100 ml. of water a heavy precipitate was immediately formed.

The following are examples of the application of the invention.

Method 1.—Plugging of water bearing formations in a drilling operation

In air drilling operations, formations are penetrated which seep water into the hole. This water can be handled momentarily, i.e., while penetrating the formation, but eventually the accumulation of water in the hole is sufficient to cause excess wetting and balling up of the cuttings. It is therefore desirable to seal off this water seepage. This can be done by packing off the seeping formation and squeezing into the water seeps a solution which will plug off the water channels. The plugging solution can be a solution of urea and a hydrolyzable salt according to the present invention.

In air drilling, air instead of liquid is passed down through the drill stem to lift the cuttings. When a water bearing formation is encountered, first the cuttings will become moist. Next, the droplets of water may be visible in the gases that pass from the surface casing. If the rate of flow of water from the formation into the well continues to increase, wetting and balling up of the cuttings will occur. If this takes place, the present invention may be used to inhibit the flow of water into the well. In practicing the present invention, a packer may be set near the bottom of the drill stem and between the drill stem and the formation. The packer will be set above the formation that was being drilled through when it was first noted that the cuttings were wet. By examining the cuttings and the visible water in the gases issuing from the well, while air drilling, the thickness and the depth of the water bearing formations can be determined.

The temperature of the formation that it is desired to seal can also be determined. Next, the concentration of, say, ferric chloride and urea for plugging the formation can be determined. The aqueous solution used for plugging the formation can contain about two per cent urea and enough ferric chloride to develop a heavy floc in about two hours. The higher the concentration of ferric chloride the longer the period required for developing the heavy floc. If the formation to be sealed is at 135° F., the solution should contain about 4 grams of $FeCl_3 \cdot 6H_2O$ and two percent urea by weight.

About 12 gallons of solution per foot of water bearing formation and enough solution to fill the well below the packer is pumped into the drill stem and followed with a liquid, such as water. Water is pumped into the drill stem until it is estimated that the water producing formation has taken about 12 gallons per foot of formation. In some applications, it may be found that the pressure required to force the solution into the formation becomes so high that 12 gallons of solution per foot of formation cannot be injected. After forcing the solution into the formation, the liquid in the drill stem is allowed to stand for two hours. After this period has elapsed, the packer is removed and the excess liquid is blown from the well. After the excess liquid has been blown from the well, drilling can again commence.

*Method 2.—Plugging of water bearing formation in producing wells*

In stratified reservoirs that are being water flooded, the more highly permeable stratum are flooded out more rapidly and produce excessive amounts of water. It would be desirable to plug off these strata when they are watered out so as to cut down on fluid lifting costs and fluid separating costs. These strata can be plugged by setting packers over the interval and forcing in a solution of urea and a hydrolyzable salt.

Water coming into a producing well from the water table can be minimized according to the present invention by injecting the urea solution of a hydrolyzable salt into the bottom of the well, using such able packers to confine the injection into the bottom of the well.

The concentration of ingredients in the solution can be determined as described above. The water producing part of the formation is temporarily plugged at the bottom of this formation and a packer on the end of the tubing is set at the top of this formation. A solution of the required concentration is pumped through the tubing into the water producing formation in the same manner as earlier described in the above air drilling situation. After the solution has set in the water bearing formation for two hours, the plug, tubing and packer can be removed and the producing equipment replaced in the well. When production is first begun, the excess solution will be pumped out of the well.

*Method 3.—Altering injection pattern and efficiency in water flooding*

It is possible that oil displacement efficiency, in a water flooding operation, could be increased by incorporating in the flood water a slug of a solution that would eventually cause some internal reservoir plugging. The main plugging would take place in the channels carrying the bulk of the flood water. With these channels either completely or partially plugged, the injected water will have to seek new channels of flow.

When using the present invention to cause same internal plugging as just described, a meter is passed down through the casing of the well until it is adjacent the top of the permeable formation into which water is being forced. From this point, the meter is gradually lowered and the change in rate of flow of water passing through the meter is recorded. Next, the part of the formation that is taking water the fastest is determined from the rates of flow determined from the meter. This most permeable part of the formation is blocked off by the same method as described in method 2. The remainder of the method of the application of the invention to method 3 is the same as that described for method 2, except that the excess fluid is pumped from the well before water injection is started.

It will be obvious to those skilled in the art having studied this disclosure and the appended claims that additives which will hasten or otherwise control the formation of the precipitate, for example by controlling the rate of release of the carbon dioxide, can be included in the formation or the fluid injected thereinto. The temperature at which the fluid is injected into the formation, the temperature of the formation, the rate of injection and other variables are apparent to one skilled in the art having knowledge of this disclosure. For example, it is within the scope of the appended claims to include in the solution injected into the formation a heat-releasing material or materials. It is also within the scope of the said claims to preheat the formation or to heat it subsequent to the injection of the fluids, as may be desired.

It is within the scope of this invention to use mixtures of salts, e.g., $BaCl_2$ and $FeCl_3$. In this manner, both the carbon dioxide and ammonia can each react as herein set forth.

Reasonable variation and modification are possible within the scope of the foregoing disclosure and appended claims to the invention the essence of which is that the decomposition of urea to yield carbon dioxide and ammonia is accomplished in a formation in which there is also present at least one material which will combine with the carbon dioxide and/or with the ammonia to form an insoluble plugging or sealing agent.

I claim:

1. A method of sealing a porous formation which comprises injecting into said formation urea in a manner such that it will release carbon dioxide and ammonia in the formation and therein causing essentially only at least one of the carbon dioxide and ammonia to react with a previously placed material in said formation to form an insoluble sealing agent.

2. A method of sealing a porous formation which comprises injecting into said formation urea under conditions causing decomposition of the same to yield carbon dioxide and ammonia, and also injecting a material which will react with at least one of said carbon dioxide and ammonia to form an insoluble sealing agent in the formation.

3. A method according to claim 2 wherein the injected material is barium chloride.

4. A method according to claim 2 wherein the injected material is ferric chloride.

5. A method according to claim 2 wherein the injected material is an acid solution of calcium oxalate.

6. A method according to claim 2 wherein the injected material is aluminum chloride.

7. A method according to claim 2 wherein urea is decomposed in the presence of a material which reacts with carbon dioxide to form an insoluble material and in presence of a material which reacts with ammonia to form an insoluble material.

8. A method according to claim 2 wherein the injected material is aluminum sulfate.

9. A method according to claim 2 wherein the injected material is ferric sulfate.

10. A method of sealing a porous formation which comprises injecting into said formation urea under conditions causing decomposition of the same to yield carbon dioxide and ammonia, and also simultaneously injecting a material which will react with at least one of said carbon dioxide and ammonia to form an insoluble sealing agent in the formation.

References Cited by the Examiner

UNITED STATES PATENTS

| 2,272,672 | 2/42 | Kennedy | 166—9 |
| 2,345,611 | 4/44 | Lerch et al. | 166—33 |
| 2,990,881 | 7/61 | Nathan et al. | 166—38 |
| 3,004,598 | 10/61 | Ramos et al. | 166—38 |

OTHER REFERENCES

Norris: Organic Chemistry, 3rd edition, published 1931 by McGraw-Hill, New York, page 219.

CHARLES E. O'CONNELL, *Primary Examiner.*

BENJAMIN BENDETT, *Examiner.*